US010841086B2

(12) United States Patent
Alwen (10) Patent No.: US 10,841,086 B2
(45) Date of Patent: Nov. 17, 2020

(54) FACILITATING COMMUNICATIONS USING HYBRID CRYPTOGRAPHY

(71) Applicant: Wickr Inc., San Francisco, CA (US)

(72) Inventor: Joël Alwen, Vienna (AT)

(73) Assignee: Wickr, Inc., Pleasanton, CA (US)

( * ) Notice: Subject to any disclaimer, the term of this patent is extended or adjusted under 35 U.S.C. 154(b) by 203 days.

(21) Appl. No.: 15/889,343

(22) Filed: Feb. 6, 2018

(65) Prior Publication Data

US 2019/0245682 A1 Aug. 8, 2019

(51) Int. Cl.
| H04L 29/06 | (2006.01) |
| H04L 9/08 | (2006.01) |
| H04L 9/32 | (2006.01) |
| H04L 9/16 | (2006.01) |

(52) U.S. Cl.
CPC ............ *H04L 9/085* (2013.01); *H04L 9/0822* (2013.01); *H04L 9/0844* (2013.01); *H04L 9/0861* (2013.01); *H04L 9/16* (2013.01); *H04L 9/3247* (2013.01); *H04L 63/0428* (2013.01)

(58) Field of Classification Search
CPC ..... H04L 9/0822; H04L 9/085; H04L 9/0844; H04L 63/0428; H04L 9/0861; H04L 9/3247; H04L 9/16
See application file for complete search history.

(56) References Cited

U.S. PATENT DOCUMENTS

| 7,110,539 B1 | 9/2006 | Bao et al. |
| 9,712,512 B2 | 7/2017 | Lerman et al. |
| 2006/0068758 A1 | 3/2006 | Dharmadhikari et al. |
| 2007/0081668 A1 | 4/2007 | McGrew et al. |
| 2007/0180227 A1 | 8/2007 | Akimoto |
| 2009/0276830 A1 | 11/2009 | O'Connor |
| 2010/0027796 A1 | 2/2010 | Robert |
| 2010/0046755 A1 | 2/2010 | Fiske |
| 2010/0306525 A1 | 12/2010 | Ferguson |
| 2011/0202755 A1* | 8/2011 | Orsini ................... H04L 63/029 713/151 |
| 2012/0039469 A1 | 2/2012 | Mueller et al. |
| 2012/0166582 A1 | 6/2012 | Binder |
| 2016/0226844 A1 | 8/2016 | Pecka et al. |

(Continued)

OTHER PUBLICATIONS

T. Dierks et al. RFC 4346—The Transport Layer Security (TLS) Protocol Version 1.1. Apr. 2006.

*Primary Examiner* — Tri M Tran (74) *Attorney, Agent, or Firm* — Banner & Witcoff, Ltd.

(57) ABSTRACT

The present application describes a method, system, and non-transitory computer-readable medium for exchanging encrypted communications using hybrid encryption. According to the present disclosure, a first device receives an encrypted communication from a second device. The encrypted communication includes a first encrypted secret, a second encrypted secret, a first signature, and a second signature. The first device verifies the first signature and the second signature, and, when the first and second signatures are valid, decrypts the first encrypted secret using a first encryption algorithm and the second encrypted secret using a second encryption algorithm. The first device combines the first decrypted secret and the second decrypted secret to recover a first communication and provides the first communication to a user of the first device.

19 Claims, 8 Drawing Sheets

(56) References Cited

U.S. PATENT DOCUMENTS

| | | |
|---|---|---|
| 2016/0294829 A1 | 10/2016 | Angus |
| 2017/0155628 A1 | 6/2017 | Rohloff et al. |
| 2018/0063101 A1 | 3/2018 | Clark et al. |
| 2018/0345810 A1 | 12/2018 | Shuaib et al. |
| 2019/0068746 A1 | 2/2019 | Bhatnagar et al. |
| 2019/0074969 A1 | 3/2019 | Spies et al. |
| 2019/0386825 A1 | 12/2019 | Bhattacharya et al. |

* cited by examiner

FACILITATING COMMUNICATIONS USING HYBRID CRYPTOGRAPHY

STATEMENT REGARDING FEDERALLY SPONSORED RESEARCH OR DEVELOPMENT

This invention was made with Government support under Contract No. 2014-14031000011 awarded by the Central Intelligence Agency. The Government has certain rights in the invention.

CROSS-REFERENCE TO RELATED APPLICATIONS

This application is related to co-pending application U.S. Ser. No. 15/889,337, entitled "Facilitating Communications using Hybrid Cryptography," filed on Feb. 6, 2018, the entirety of which is incorporated by reference herein.

BACKGROUND OF THE INVENTION

Figure 1:
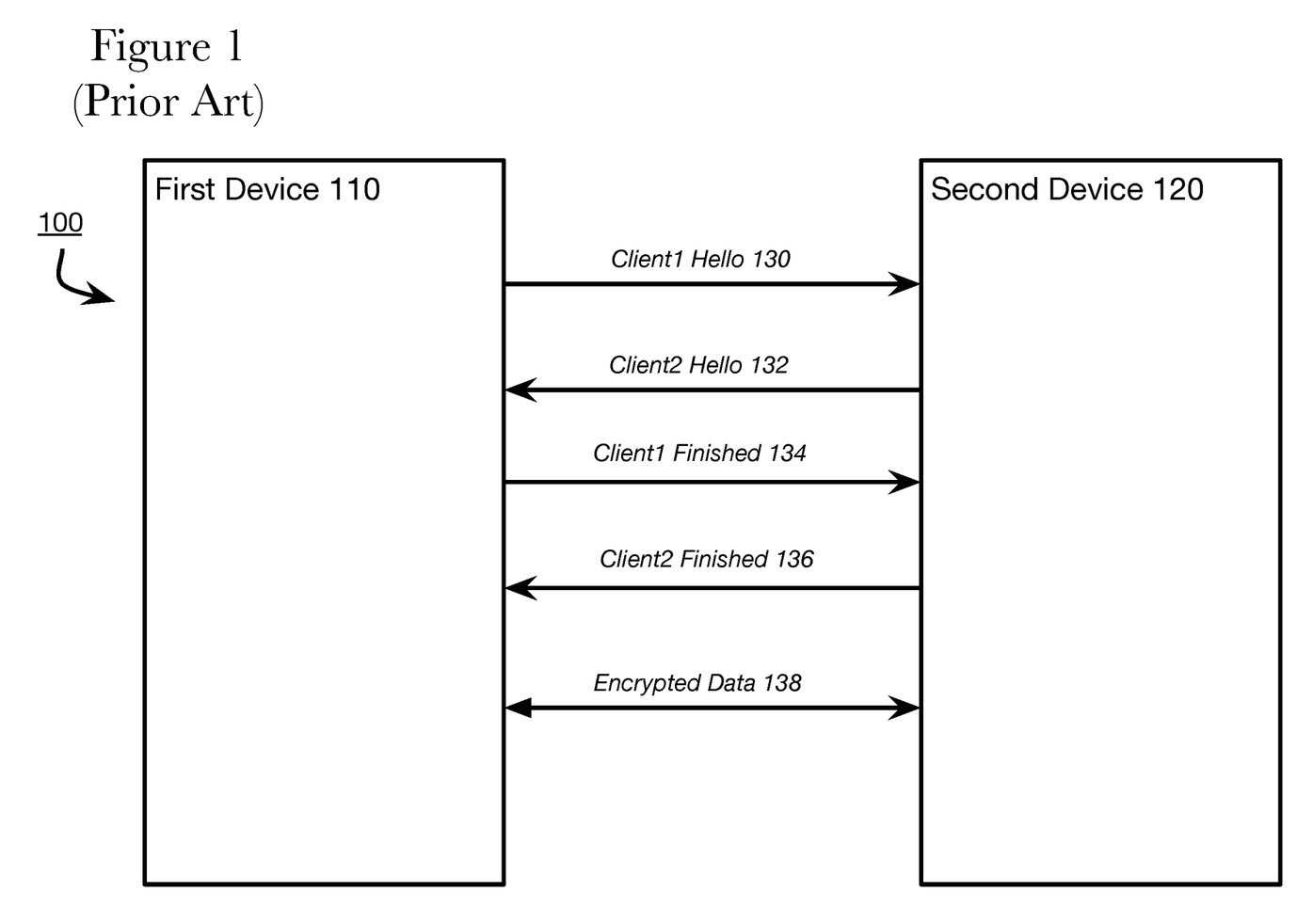
FIG. 1 illustrates a prior art technique for negotiating cipher suites via a handshake algorithm.

In order to establish a secure communication channel, a first party and second party begin by negotiating the security settings for the secure communication channel. FIG. 1 shows a prior art handshake 100 for establishing cryptographic primitives to configure the secure communication channel. The handshake 100 begins when a first device 110 sends a first communication 130 to the second device 120. The first communication 130 includes a first list of preferred cipher suites that the first device supports and is willing to use to communicate. A cipher suite is a collection of schemes and algorithms that allow the first device 110 and the second device 120 to coordinate the encryption schemes and algorithms used to send and receive encrypted communication via the secure communication channel. Typically, a cipher suite includes an encryption scheme, an authentication scheme, a key exchange scheme, and a Message Authentication Code (MAC) scheme. As used herein, a "scheme" is a set of algorithms required for a particular application. For instance, an encryption scheme consists of three algorithms, including a key generation algorithm, an encryption algorithm, and a decryption algorithm.

In response to receiving the list of preferred cipher suites from first device 110, second device 120 compares the first list of preferred cipher suites to a second list of preferred cipher suites belonging to second device 120. Based on this comparison, second device 120 selects a common cipher suite that appears on both the first list and the second list. If more than one cipher suite is common to the first and second lists, second device 120 selects the cipher suite with the highest common preference for the first and second devices.

After choosing the common cipher suite, second device 120 provides a second communication 132 to first device 110 that includes an indication of the common cipher suite to be used to establish the second communication channel. Second communication 132 also includes a first key exchange component, such as an RSA public key or a Diffie-Hellman public key.

Upon receiving second communication 132, first device 110 obtains the indication of the common cipher suite and configures the encryption schemes set forth in the common cipher suite in order to communicate with second device 120. Additionally, first device 110 retrieves the first key exchange component from second communication 132. When the first key exchange component is an RSA public key, first device 110 encrypts either a shared secret or a session key using the RSA public key. When the first key exchange component is a Diffie-Hellman public key, first device 110 derives a key-encrypting key according to the Diffie-Hellman key agreement scheme and encrypts the shared secret or session key using the derived key-encrypting key. First device 110 transmits the encrypted shared secret or session key in third communication 134. When a key agreement scheme, like Diffie-Hellman, is employed, third communication 134 includes a second key exchange component (i.e., a Diffie-Hellman public key) for second device 120 to derive the key-encrypting key to decrypt the shard secret or session key. Third communication 134 also includes a challenge to verify the key exchange and authentication schemes were executed successfully.

In response to receiving third communication 134, second device 120 decrypts the shared secret or session key. This may include decrypting the shared secret or session key using an RSA private key or deriving a key-encrypting key according to Diffie-Hellman and decrypting the shared secret or session key using the derived key-encrypting key. Once the shared secret or session key is recovered, second device 120 uses the shared secret or session key to respond to the challenge issued in communication 134. Accordingly, second device 120 responds to the challenge in fourth communication 136. Typically, fourth communication 136 includes an indication that decryption and/or authentication was successful. Once the key exchange and/or authentication are validated as being successful, first device 110 and second device 120 exchange data encrypted with a shared session key.

While it is a common technique to establish a secure communication channel, handshake 100 is not without its problems. For example, first device 110 and second device 120, oftentimes, do not share a common preference for a particular cipher suite. Accordingly, one party, or both parties, compromise by agreeing to use the same cipher suite. However, the agreed upon cipher suite may provide a lesser degree of security than the party's preferred cipher suite. This compromise in security increases vulnerabilities that would allow malicious users to eavesdrop or conduct Man-in-the-Middle (MiTM) attacks on the information transmitted over the channel negotiated by the parties.

Thus, there is a technical problem in the field of cryptographic communications of facilitating communications between parties with different cipher suites that would allow each party to use their preferred cipher suite without having to deviate from the level of security provided by the party's preferred cipher suite.

BRIEF SUMMARY OF THE INVENTION

The present disclosure describes a method, system, and non-transitory computer-readable medium for facilitating communications between users with different cipher suites that allows each user to use their preferred cipher suite. In order to facilitate these communications, the original communication is divided into a first and second secret according to a secret sharing algorithm. The first secret is encrypted according to a first cipher suite, while the second secret is encrypted according to a second cipher suite. A first signature and second signature are generated from both the first encrypted secret and the second encrypted secret using signing keys associated with the first and second cipher suites, respectively. The first encrypted secret, the second encrypted, the first signature, and the second signature are transmitted to one or more receivers.

On the receiving end, the receiver receives the first encrypted secret, the second encrypted, the first signature, and the second signature from the sender. The receiver then validates the first and second signature. When the signatures are valid, the receiver decrypts the first secret and the second secret. Once decrypted, the first secret and second secret are combined, using a secret sharing algorithm, to recover the first communication.

Because both the first secret and the second secret are necessary to recover the communication, encrypting each secret with a different cipher suite provides the security associated with each cipher suite. Accordingly, users are allowed to communicate with other users using, in part, their preferred cipher suite. Another benefit of the hybrid encryption techniques described above is experimentation with new cipher suites. For example, a sender encrypts the first secret with a standard encryption suite and the second secret with a new encryption suite, such as a post-quantum cryptography solution. Since the first secret is necessary to recover the first communication, the sender is assured that the communication will have the security benefits of at least the first cipher suite.

BRIEF DESCRIPTION OF THE DRAWINGS

Various embodiments of the invention are disclosed in the following detailed description and the accompanying drawings.

DETAILED DESCRIPTION

The present disclosure describes a system and method for a first party, with a first cipher suite, to securely communicate with a second party, with a second—different—cipher suite.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

Figure 2:
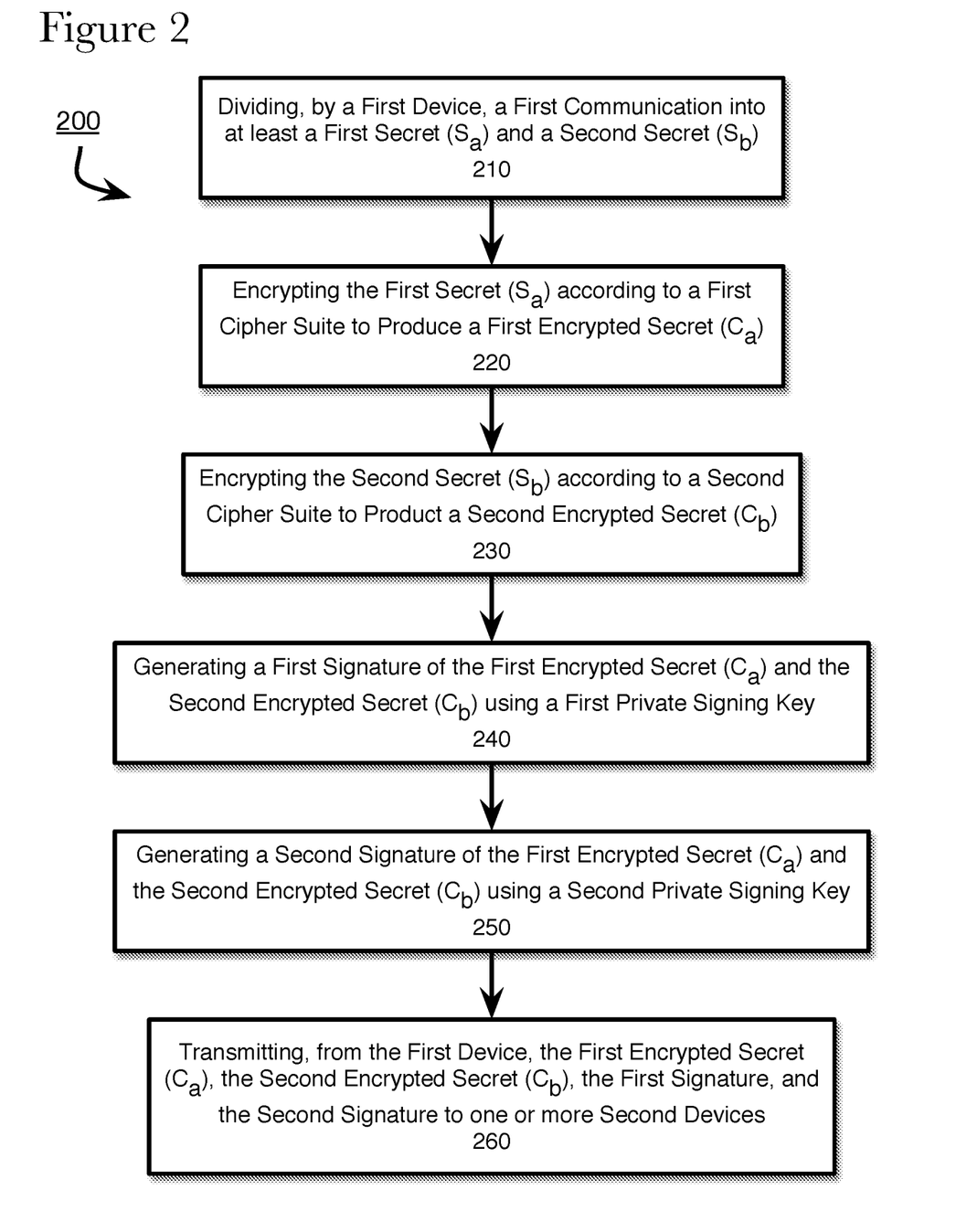
FIG. 2 illustrates a process according to one aspect of the disclosure for transmitting an encrypted communication to a user with a different cipher suite.

In order to solve the technical problem of transmitting encrypted communications between parties with different cipher suites, the present disclosure combines secret sharing schemes and encryption schemes to encrypt communications exchanged between a first party and a second party. This hybrid cryptography technique allows both parties to communicate without having to compromise, thereby affording each party the security provided by their preferred cipher suite. FIG. 2 illustrates a process 200 for transmitting an encrypted communication from a first device with a first cipher suite to a second device with a second cipher suite.

In block 210, a first device begins by dividing a first communication into at least a first secret ($S_a$) and a second secret ($S_b$). As used herein, "communication" includes text messages, chat room messages, control messages, commands, e-mails, documents, audiovisual files, Short Message Service messages (SMSes), Multimedia Messages Service messages (MMSes), direct communications (e.g., one-to-one communications between a sender and receiver), group chats, or secure chat room communications, and the like. According to some embodiments, the content of communications includes sensitive information, such as electronic transactions, credit card information, passwords, encryption keys, directories, and storage drive protection, video on demand security, online gaming, gambling, electronic distribution of music, videos, documents, online learning systems, databases, cloud storage and cloud environments, bank transactions, voting processes, military communications, security of medical records, instructions medically implanted devices and doctors, etc.

In preferred embodiments, the first communication is divided into at least a first secret ($S_a$) and a second secret ($S_b$) using a secret sharing scheme, such as Shamir's scheme, Blakley's scheme, Rabin's Information Dispersal Algorithm (IDA), or the like. Furthermore, the first communication may be divided into more than the first secret ($S_a$) and the second secret ($S_b$).

In block 220, first secret ($S_a$) is encrypted according to a first cipher suite to produce a first encrypted secret ($C_a$). In preferred embodiments, the first cipher suite defines the preferred encryption scheme, authentication scheme, key exchange scheme, and MAC scheme for the first device. In preferred embodiments, the encryption scheme includes a symmetric encryption algorithm, such as Advanced Encryption Standards (AES), Data Encryption Standard (DES), Triple-DES (3DES), RC4, IDEA, or Camellia. The authentication scheme is a suitable signature scheme, such as RSA signatures, Digital Signature Algorithm (DSA), or Elliptic Curve Digital Signature Algorithm (ECDSA). Preferably, ECDSA is used with keys derived according to at least one of a P-521 curve and/or ed448 curve. The key exchange scheme is any suitable key exchange or key agreement scheme, such as RSA, Diffie-Hellman, Elliptic-Curve Diffie-Hellman (ECDH), a password-authenticated key agreement (PAKE) protocol (e.g., Secure Remote Password (SRP)), a pre-shared key (PSK) scheme, etc. In preferred embodiments, ECDH is used as the key agreement scheme with either the P-521 or ed448 curve. With respect to authentication schemes, the first cipher suite uses a hash-based message authentication code (HMAC). In preferred embodiments, SHA512 is the hash function used to generate the message authentication code, however, any suitable hash algorithm may be used (i.e., SHA, MD5, MD4, MD, etc.).

In order to encrypt first secret ($S_a$) first device derives a first encryption key. In preferred embodiments, the first encryption key is derived from pseudorandom bytes obtained from the first device. For example, the pseudorandom bytes are obtained from appropriate sources, such as a random noise generator or ephemeral environmental noise obtained from device drivers and other kernel operations. The first encryption key encrypts the first secret ($S_a$) in accordance with the encryption algorithm set forth in the first cipher suite to produce a first cipher text ($C_a$).

After encrypting the first secret, the first encryption key is encrypted. In preferred embodiments, the first encryption key is encrypted with a first key-encrypting key using a symmetric encryption algorithm, such as AES. The first key-encrypting key is derived using a first ephemeral private key associated with the first device and a second ephemeral public key associated with the second device. A first shared secret is derived from the first ephemeral private key and the second ephemeral public key according to a key agreement scheme, such as Diffie-Hellman. The first shared secret, a first identifier associated with the first device, and a second identifier associated with the second device are inputted into a key derivation function to derive the first key-encrypting key. In preferred embodiments, the first identifier associated with the sender, such as a username or an application identifier, and the second identifier is an application identifier that uniquely identifies the application performing the encryption process on the first device. In alternative embodiments, the second identifier is a device identifier that uniquely identifies the second device. If the communication is addressed to a plurality of second devices, the first device will derive a unique key-encrypting key for each of the plurality of second devices. Because the ephemeral key is associated with the instance of the secure collaboration application and the second identifier is associated with the device, first key-encrypting key effectively binds the first encrypted secret ($C_a$) to the second device. This improves security since the second device is the only device with access to the second ephemeral private key that is able to derive the first key-encrypting key needed to access the message. Further, using the first identifier as an input to derive the key-encrypting key prevents certain types of replay attacks. Alternatively, a simpler approach may be taken with the first key-encrypting key being a public key, such as an RSA public key, associated with the second device.

In block 230, second secret ($S_b$) is encrypted according to a second cipher suite to produce a second encrypted secret ($C_b$). In preferred embodiments, the second cipher suite is associated with the second device. Encrypting the first secret and the second secret according to the first and second cipher suites, respectively, ensures at least the minimum level of security for the first communication since the first secret and the second secret are required to reproduce the first communication. Thus, using each party's preferred cipher suite to encrypt the communication provides the level of security provided by each party's respective cipher suite without compromise. In preferred embodiments, the second cipher suite is substantially similar to the first cipher suite. For example, the encryption scheme and MAC scheme used by the first and second cipher suites are the same and only differ in the authentication (e.g. signature scheme) and key agreement schemes. In another example, the first and second cipher suites differ in the key derivation functions used for the authentication and key exchange schemes. In these examples, the first cipher suite derives keys according to a first elliptic curve (e.g., P-521), while the second cipher suite derives keys according to a second elliptic curve (e.g. ed448). In alternative embodiments, the second cipher suite is an experimental cipher suite, such as a post-quantum cryptography cipher suite. According to these embodiments, the post-quantum cryptography cipher suite may be used by both the first device and the second device and include post-quantum signature and key agreement schemes.

After encrypting the second secret, the second encryption key is encrypted with a second key-encrypting key. Much like the first key-encrypting key, the second key-encrypting key is derived using a third ephemeral private key associated with the first device and a fourth ephemeral public key associated with the second device. Preferably, the second key-encrypting key similarly binds the encrypted second secret ($C_b$) to the second device.

Next, the first device generates a first signature from the first encrypted secret ($C_a$) and second encrypted secret ($C_b$) using a first private signing key in block 240. In preferred embodiments, the first signature also includes the first ephemeral public key, the third ephemeral public key, and the key identifiers associated with the second and fourth ephemeral public keys. The first signature is generated using the authentication scheme specified in the first cipher suite. The first private signing key is associated with the first device, and the corresponding first public signing key is publicly accessible to one or more second devices to verify the first signature generated from the first private signing key.

In block 250, the first device generates a second signature from the first encrypted secret ($C_a$) and second encrypted secret ($C_b$) using a second private signing key. Similarly, the second signature includes the first ephemeral public key, the third ephemeral public key, and the key identifiers associated with the second and fourth ephemeral public keys. The second signature is generated using the authentication scheme set forth in the second cipher suite. Like the first private signing key, the second private signing key is associated with the first device. The second public signing key is available to one or more second devices to verify the second signature generated from the second private signing key.

In block 260, the first device transmits a first communication to one or more second devices. In preferred embodiments, the first communication is a serialized packet. The serialized packet includes the first encrypted secret ($C_a$), the second encrypted secret ($C_b$), the first signature, and the second signature. Additionally, the serialized packet includes the encrypted first encryption key, the encrypted second encryption key, a first identifier associated with the second ephemeral public key, a second identifier with the fourth ephemeral public key, a first ephemeral public key that corresponds to the first ephemeral private key, and a third ephemeral public key that corresponds to the third ephemeral private key for each of the one or more second devices. Additionally, the serialized packet includes the first signature and the second signature. Accordingly, the serialized packet allows the encrypted data, message security controls, and decryption information to securely travel with the encrypted communication. Serialized packets also provide cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.).

Figure 3:
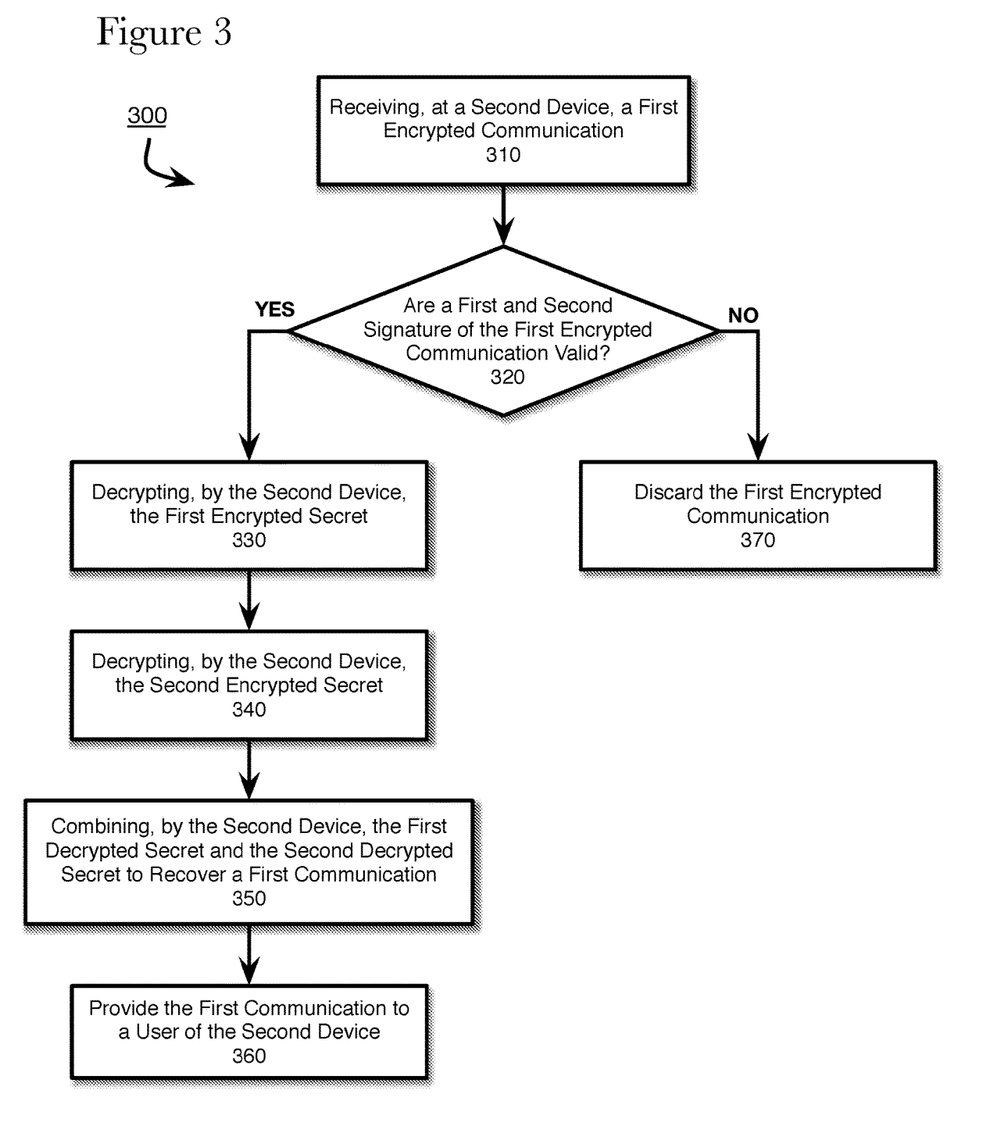
FIG. 3 illustrates an exemplary method for receiving and decrypting an encrypted communication from a user with a different cipher suite than the receiver according to one aspect of the disclosure.

In preferred embodiments, the first device transmits the first communication to one or more second devices via a server. The server determines whom the first communication is addressed, stores the first communication in each of the one or more second devices' queues, and provides a notification, such as a push notification, to the one or more second devices. In alternative embodiments, the first device transmits the first communication to the one or more second devices via a peer-to-peer (P2P) communication protocol. In some embodiments, transmitting the first communication to the second device via a P2P communication includes a block-chain based solution wherein the need for a server is obviated. FIG. 3 illustrates a process 300 for decrypting the first communication according to one aspect of the disclosure.

In block 310, the second device receives the first encrypted communication. As noted above, the first encrypted communication is downloaded from a server in response to receiving a push notification. Alternatively, the first encrypted communication is received directly from the first device via a P2P protocol.

As noted above, the first encrypted communication is a serialized packet that includes a first identifier associated with the second ephemeral public key, a second identifier with the fourth ephemeral public key, a first ephemeral public key that corresponds to the first ephemeral private key, a third ephemeral public key that corresponds to the third ephemeral private key for each of the one or more second devices, the first signature and the second signature. When the first encrypted communication is addressed to one or more second devices, the second device identifies the array of information corresponding to its instantiation of the application. For example, the first encrypted communication indexes the information using an application identifier associated with the second device.

In block 320, the second device determines whether the first and second signatures included in the first encrypted communication are valid. In this regard, the second device verifies the first signature using a first public signing key and a signature verification algorithm set forth in the first cipher suite. The first public signing key is related to the first private signing key used to generate the first signature. Next, the second device verifies the second signature using a second public signing key and a signature verification algorithm defined in the second cipher suite. Similar to the first public signing key, the second public signing key is related to the second private signing key used to generate the second signature. In preferred embodiments, the second device obtains the first and second public signing keys from the server. Alternatively, the second device acquires the first and second public signing keys directly from the first device, for example, via a P2P communication or by scanning a QR code or other information from the first device.

When the first signature, the second signature, or both are invalid, process 300 proceeds to block 370, where the first device discards the first encrypted communication. However, when both the first signature and the second signature are valid, process 300 proceeds to block 330.

In block 330, the second device decrypts the first encrypted secret ($C_a$). Decrypting the first encrypted secret ($C_a$) begins with the second device deriving the first key-encrypting key. In preferred embodiments, second device derives the first key-encrypting key by first retrieving the second ephemeral private key from a secure storage using the first identifier received in the first communication. After retrieving the second ephemeral private key, the second device derives a first shared secret using the first ephemeral public key received in the first communication and the second ephemeral private key. Next, the shared secret, the first identifier associated with the first device, and the second identifier associated with the second device are inputted into a key derivation function to derive the first key-encrypting key. In alternative embodiments, the first key-encrypting key is a private key, such an RSA private key, retrieved using the first identifier received in the first encrypted communication. The first key-encrypting key is used to decrypt the encrypted first encryption key. Finally, the first encrypted secret ($C_a$) is decrypted with the decrypted first encryption key using a symmetric encryption algorithm to recover the first secret ($S_a$).

In block 340, the second device decrypts the second encrypted secret ($C_b$). Similar to the techniques used to decrypt the first encrypted secret ($C_a$), the second device begins by deriving the second key-encrypting key. Preferably, the second device retrieves the fourth ephemeral private key from secure storage using the second identifier received in the first communication and, then, generates a second shared secret using the fourth ephemeral private key and the third ephemeral public key received in the first encrypted communication. Next, the second shared secret, the first identifier, and the second identifier are inputted into a key derivation function to derive the second key-encrypting key. In alternative embodiments, the second key-encrypting key is a private key retrieved from secure storage. The second key-encrypting key is used to decrypt the encrypted second encryption key. Finally, the second encrypted secret ($C_b$) is decrypted with the decrypted second encryption key using a symmetric encryption algorithm to recover the second secret ($S_b$).

In block 350, the second device combines the first secret ($S_a$) and the second secret ($S_b$) to recover the first communication. In preferred embodiments, the first secret ($S_a$) and the second secret ($S_b$) are combined using a secret sharing algorithm. In block 360, the first communication is provided to a user of the second device.

Because both the first secret ($S_a$) and second secret ($S_b$) are necessary to recover the first communication, encrypting the first secret ($S_a$) and second secret ($S_b$) according to the schemes set forth in the first cipher suite and the second cipher suite, respectively, assures both parties that the communication is secured with the minimum level of protection provided by each cipher suite. Moreover, the hybrid cryptography protocol described herein eliminates the need to perform a handshake to establish the secure communication channel, allowing for a more time-efficient technique for establishing an encrypted communication channel.

While the embodiments of FIGS. 2 and 3 describe exchanging communications, the hybrid cryptography protocol described above may be used for other purposes, such as transmitting a communication encryption key or establishing a session key. For example, a communication is encrypted with a communication encryption key. The communication encryption key is divided according to a secret sharing algorithm and the secrets are encrypted according to different cipher suites. Accordingly, the recipient is able to recover the communication encryption key using the hybrid cryptography protocol described above, and subsequently decrypt the encrypted communication. Encrypting the communication encryption key results in a smaller packet than if the entirety of the communication was encrypted using the hybrid cryptography protocol described above. Thus, encrypting the communication encryption key using the hybrid cryptography protocol, while the communication itself is encrypted with the communication encryption key, results in a more secure and efficient transmission.

Similarly, a session key is established using the hybrid cryptography protocols described above. Transmitting communication encryption keys and establishing a session key using the techniques described herein provides a quicker and more time efficient improvement over traditional handshake exchanges. Moreover, the communication encryption key and the session key are distributed more securely than handshake techniques since only an authorized recipient is able to decrypt the keys. Accordingly, the hybrid cryptography protocol described above makes sharing encryption keys impervious to Man-in-the-Middle attacks.

Figure 4:
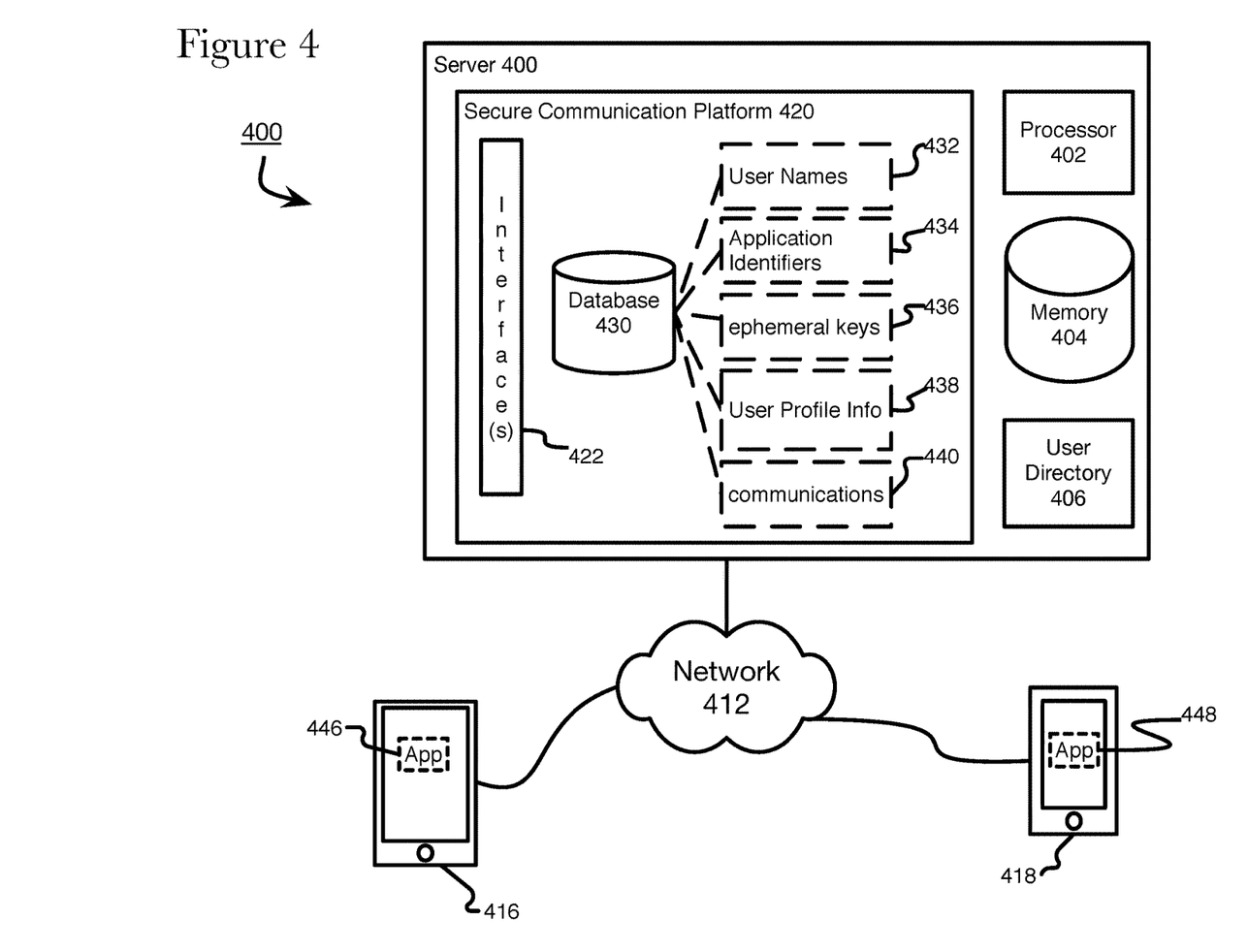
FIG. 4 shows an exemplary environment for exchanged encrypted communications according to the embodiments disclosed herein.

FIG. 4 illustrates an example of an environment in which the hybrid cryptography protocol described above may be deployed. In this regard, FIG. 4 shows a system 400 that includes first client device 416 and a second client device 418 connected to secure communication platform 420, located on server 400, via network 412. First client device 416 and second client device 418 execute a first secure collaboration application 446 and a second secure collaboration application 448, respectively, that allows first device 416 and second device 418 to exchange communications secured using the techniques described above in FIGS. 2 and 3.

In preferred embodiments, secure communication platform 420 is a server-based application implemented on server 400 that includes processor 402, memory 404, user directory 406, and the secure communication platform 420. In alternative embodiments, secure communication platform 420 is a cloud-based application implemented on server 400. Accordingly, server 400 may be a stand-alone server, a corporate server, a server located in a server farm or cloud-computing environment, or one or more virtual machines configured to provide secure communication platform 420 to an enterprise as a Software as a Service (SaaS).

Processor 402 is any conventional processor capable of interacting with memory 404 and user directory 406 and executing secure communication platform 420. In this regard, processor 402 may include a processor, a multiprocessor, a multicore processor, or any combination thereof. Alternatively, processor 102 is be a dedicated controller, such as an Application Specific Integrated Circuit (ASIC) or Field Programmable Gate Array (FPGA). Processor 402 performs a plurality of tasks on behalf of secure communication platform 420. Furthermore, whenever secure communication platform 420 is described as performing a task, either a single component or a subset of components or all components of secure communication platform 420 or server 400 may cooperate to perform the task. For example, secure communication platform 420 designates one of the keys in a pool of public keys received from a user of a device as a "reserve" key. Another task performed by secure communication platform 420 includes facilitating the addition of new keys to a user's pool of public keys as they are used. Yet another task performed by secure communication platform 420 includes dynamically adjusting the size of a user's pool of public keys as needed.

Memory 404 stores information accessible by processor 402, including instructions and data that may be executed or otherwise used by the processor 402. According to some embodiments, memory 404 stores instructions and data necessary to execute secure communication platform 420. In this regard, memory 404 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 404 may include short-term or temporary storage, as well as long-term or persistent storage. According to some examples, memory 404 may include a storage area network (SAN) accessible by server 400 and/or secure communication platform 420.

User directory 406 is a database or table capable of providing directory services. According to some embodiments, user directory is a corporate directory that includes employees' first and last names, usernames, email address, phone numbers, department information, etc. Alternatively, user directory 406 is a database or table configured to maintain information for users of secure communication platform 420. In preferred embodiments, user directory 406 is encrypted to protect the information contained therein. In further embodiments, user directory 406 serves as a secure directory that includes a table of hashed usernames, a table of application identifiers, and a table of device identifiers for secure collaboration application 420. Accordingly, user directory 106 shares information about users, systems, networks, services and applications. In some embodiments, user directory 406 is a Lightweight Directory Access Protocol (LDAP), Active Directory, or an equivalent directory service.

Although FIG. 4 illustrates processor 402, memory 404, user directory 406, and secure communication platform 420 as being located on server 400, processor 402 and memory 404 may comprise multiple processors and memories that may not be stored within the same physical housing. For example, memory 404 may be a hard drive or other storage media located in a server farm of a data center, such as a storage area network (SAN). Accordingly, references to a processor, a server, or a memory will be understood to include references to a collection of processors or servers or memories that may or may not operate in parallel. Further, the user directory 406 may be located in a separate physical housing from processor 402 and memory 404. Moreover, secure communication platform 420 may be distributed across multiple servers.

Secure communication platform 420 is configured to facilitate the exchange of communications between users of a secure collaboration application without being able to decrypt the encrypted communications as they traverse secure communication platform. As noted above, encryption keys are managed on first device 416 and second device 418. Thus, secure collaboration application cannot decrypt encrypted communications as they pass through secure communication platform 420. According to some embodiments, secure communication platform 420 integrates into an existing communication platforms, such as e-mail systems, messaging platforms, etc., to provide secure, encrypted and ephemeral communications to the existing communication platform. According to these embodiments, secure communication platform 420 integrates with existing identity systems, such as user directory 406. In some embodiments, secure communication platform 420 includes built-in support for enterprise data retention and support systems. For example, secure communication platform 420 includes a web robot ("bot") that is carbon copied (CC'd) or blind carbon copied (BCC'd) on each communication. Accordingly, the bot, as a recipient of the communication, is able to decrypt the received communication and forward the communication to a journaling system, an archiving system, a data retention system, or any combination thereof.

In order to facilitate the exchange of secure communications, secure communication platform 420 includes one or more interfaces 422 and a database 430. In preferred embodiments, one or more interfaces 422 include an application programming interface (API) configured to communicate with the secure collaboration applications installed on client devices. One or more interfaces 422 also include other types of interfaces, such as a web interface, or stand-alone software programs for desktops and laptops, running on various Operating Systems (OSes). The web interface may allow users of client devices to exchange communications without the need for a separately installed collaboration application. The standalone software program allows users to exchange secure communications via software that is downloaded by each user. According to some embodiments, secure communication platform 420 provides a master clock via one or more interfaces 422 to enforce secure time-to-live (TTL) values of messages. The TTL values can be used to enforce (e.g., on behalf of a message sender) time constraints on message access (e.g., by a receiver).

Database 430 is a relational database that stores information in a variety of tables in preferred embodiments. In this regard, database 430 includes a record for each user of platform 420 to allow users to find and communicate with other users. Accordingly, database 430 includes a table of user names 432, a table of application identifiers 434, a pool of ephemeral keys 436, and a table of user profile information 438. User profile information may include a privacy mode set by the user and one or more privacy lists to control with whom the user may communicate. Additionally, database 430 includes a table of communications 440. That is, the secure communication platform stores messages for a predetermined time in table 440. For example, when a message is received, the secure communication platform stores the message in the table of communications 440 and provides an alert, such as a push notification, to the receiver. Accordingly, the receiver accesses the secure communication platform 420 to obtain his or her messages stored in table 440. In preferred examples, table 440 stores messages for 30 days; however, this may be adjusted, as needed, based on industry standards and/or to comply with regulatory schemes.

While a database is shown in FIG. 4, other techniques can be used to store the information used by platform 420 to facilitate the exchange of encrypted communications. For example, the table of communications may be stored in a separate storage, such as memory 404 or a second server, instead of being stored within database 430. Alternatively, the information contained in the database 430 is divided between database 430 and user directory 406. In this regard, database 430 and user directory 406 may interface to exchange information. Further, additional information can be securely stored on platform 420, whether in database 430 or another appropriate location.

Users of client devices, such as the users of first device 416 and second device 418, communicate securely with one another using the techniques described herein. In preferred embodiments, first device 416 and second device 318 are mobile devices, such as a laptops, smart phones, or tablets, or computing devices, such as desktop computers or servers. As noted above, the secure collaboration application described herein allows cross-platform collaboration, thereby allowing users of various devices to communicate seamlessly. Further, each user may have different instances of the collaboration application installed across multiple devices. That is, the user of first device 416 is able to receive communications on first device 416, as well as on any other devices that the user may have that includes a copy of the secure collaboration application, such as a laptop or desktop computer. In some examples, first device 416 and second device 418 are users' personal devices (i.e. a bring your own device (BYOD) scenario). Alternatively, first device 416 and second device 418 are devices, such as sensors, game consoles, camera/video recorders, video players (e.g., incorporating DVD, Blu-ray, Red Laser, Optical, and/or streaming technologies), smart TVs, and other network-connected appliances, as applicable.

Communications between users of first device 416 and second device 418 are exchanged via network 412. Network 412 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

Figure 5:
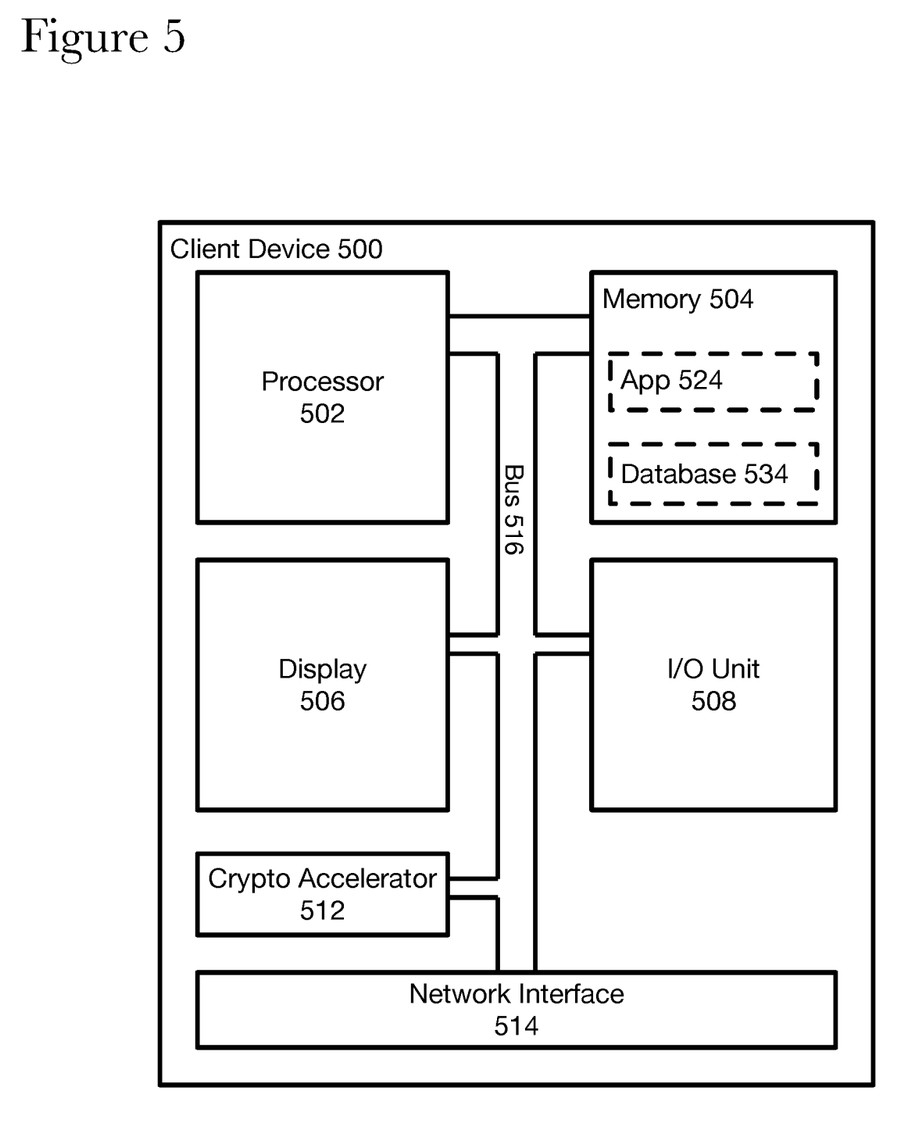
FIG. 5 illustrates a client device capable of exchanging encrypted communications in accordance with the disclosure.

To make use of the secure communication platform and hybrid cryptography protocol described above, users download and install a secure collaboration application on their client device. FIG. 5 illustrates an exemplary client device 500 that accesses security platform 420 via a secure collaboration application. In this regard, client device 500 includes a processor 502, a memory 504, a display 506, an I/O unit 508, a cryptographic ("crypto") accelerator 512, and a network interface 514 all interconnected by bus 516.

Processor 502 is any processor capable of interacting with the components of client device 500. For example, processor 502 may include a processor, multiprocessors, multicore processor, a dedicated controller, such as an ARM processor, an ASIC, or an FPGA, or any combination thereof. According to some examples, processor 502 is configured to transmit an encrypted communication by dividing a first communication into at least a first secret and a second secret using a secret sharing algorithm, encrypting the first secret using a first cipher suite to produce the first encrypted secret, and encrypting the second secret using a second cipher suite to produce the second encrypted secret. Processor 502 is also configured to receive and decrypt a first encrypted communication by verifying a first signature and a second signature, decrypting a first encrypted secret using a first encryption algorithm and the second encrypted secret using a second encryption algorithm when the first and second signatures are valid, and combining the first decrypted secret and the second decrypted secret using a secret sharing algorithm to recover a first communication.

Memory 504 stores information accessible by processor 502, including instructions and data that may be executed or otherwise used by the processor 502 and/or crypto accelerator 512. For example, memory 504 stores instructions, such as application 524. In preferred embodiments, application 524 is a secure collaboration application that provides users with the ability to participate in voice and video calls, share encrypted content, exchange encrypted communications, and share application data. Accordingly, the processes described herein are performed by the secure collaboration application executing on the first and second devices. The first and second devices include a plurality of hardware. In operation, the secure collaboration application and the hardware of the first device operate in conjunction to perform the processes described herein.

Data stored by memory 504 includes database 534. In preferred embodiments, database 534 is encrypted via an encryption algorithm, such as Advanced Encryption Standard (AES), and a 256-bit key, referred to hereinafter as a local storage key. In some examples, database 534 stores information related to secure collaboration application 524. For example, database 534 indexes information related to the secure collaboration application, such as key information (e.g. a user signing key, an application signing key, etc.), user information (e.g., username, application identifier, etc.), friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication stored in database 534. According to some embodiments, memory 504 stores a plurality of ephemeral keys received from a second user that would allow the first and second user to exchange encrypted communication peer-to-peer. Accordingly, memory 504 may be any type of media capable of storing the above information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 504 may include short-term or temporary storage, as well as long-term or persistent storage.

Display 506 is any electronic device capable of visually presenting information. In mobile devices, such as smart phones and tablets, display 506 may be a touchscreen display. Accordingly, display 506 may be integrated with I/O unit 508 to detect user inputs, as well as output data. In computing devices, display 506 may be an output, such as a VGA, DVI, or HDMI output, configured to connect to a monitor. In operation, display 506 may be configured to provide the decrypted communications from a second user or display an error message when receiver information is unobtainable, either from security platform 420 or locally on the sending device.

I/O unit 508 may be configured to receive input from a user and output data to the user. As noted above, the I/O unit 508 may work with touchscreen displays to receive input from a user. Alternatively, the I/O unit is an interface capable of interacting with input and output devices, such as keyboards, mice, monitors, printers, etc. In operation, I/O unit 508 is configured to allow a user to compose a communication before the communication is encrypted and transmitted to a receiver. Additionally, I/O unit 508 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 512 may be dedicated hardware, software, firmware, or any combination thereof that is configured to perform cryptographic operations, such as key generation, random number generation, encryption/decryption, signature generation, signature verification, etc. In preferred embodiments, crypto accelerator 512 is a dedicated processor configured to perform cryptographic operations on behalf of processor 502. In this regard, application 524 uses of crypto accelerator 512 to provide the secure communication functions described in greater detail below.

Figure 6:
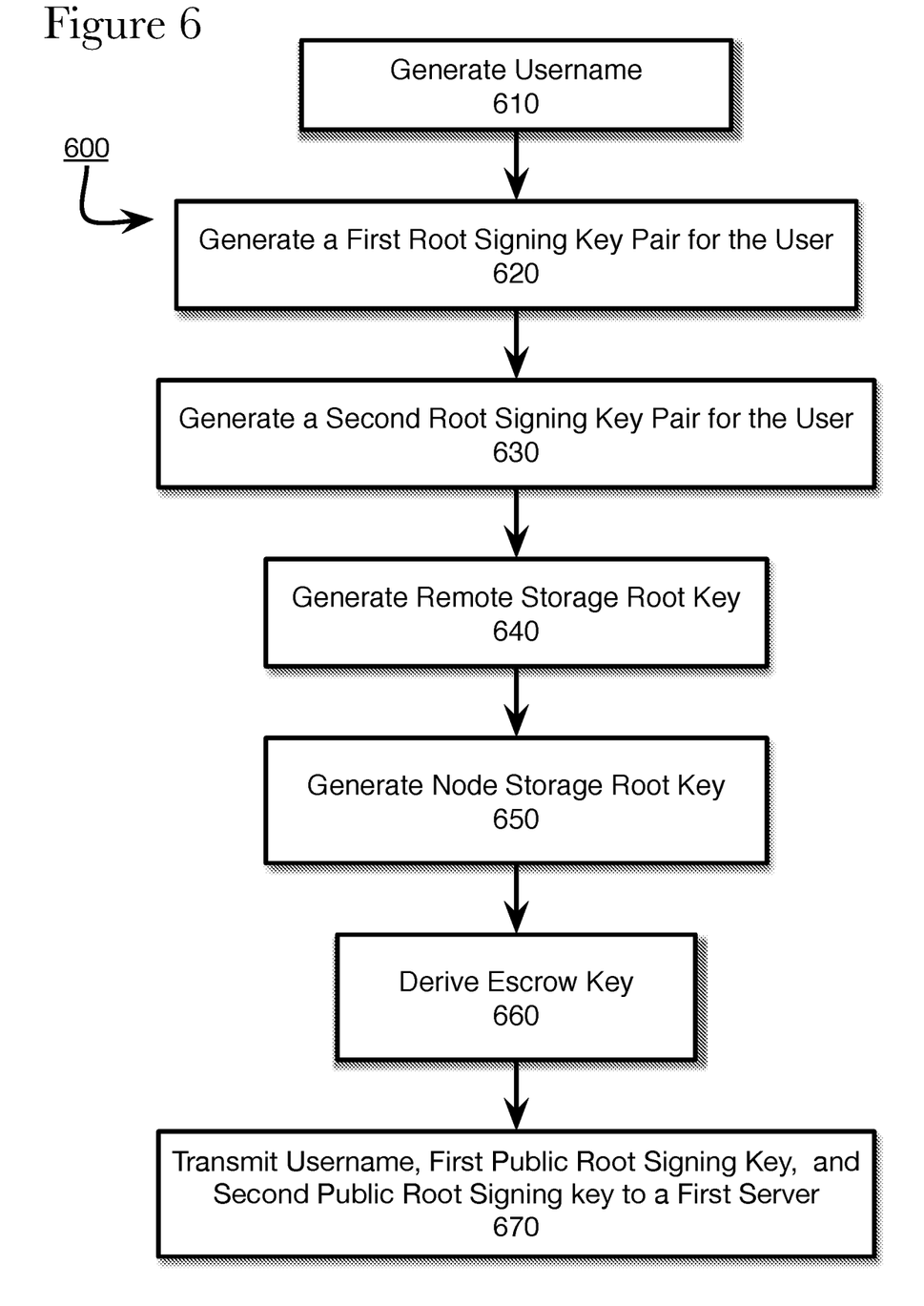
FIG. 6 illustrates a user enrollment process according to one aspect of the disclosure.

Network interface 514 may be dedicated hardware, software, firmware, or any combination thereof that is configured to connect client device 500 to network 412. In this regard, network interface 514 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 514 may be configured to transmit an encrypted first communication data to the at least one second device and receive an encrypted second communication from a second device. In other examples, interface 514 may be configured to receive an invitation to a secure communication session, transmit encrypted first communication data to at least one second device, and receive encrypted second communication data from the at least one second device To make use of the secure communication platform, a user installs the secure collaboration application on their device. Once the installation process is completed, the user enrolls himself/herself and his/her device with the secure communication platform. FIG. 6 illustrates a process 600 for user enrollment with the secure communication platform.

In block 610, a user generates a username. In preferred embodiments, the secure collaboration application, on behalf of the user, negotiates the username with the secure communication platform. That is, the secure collaboration application transmits the username selected by the user, or a representation of the username, to the secure communication platform to determine if the username is already in use. If the username is already in use, the secure communication platform provides an indication to the secure collaboration application that the username is unavailable. Accordingly, the secure collaboration application prompts the user to select another username. When the username is available, the secure collaboration application registers the username, for example, by recording the username in a database. In alternative embodiments, the username is assigned by a third party, such as a system administrator. For example, the username may be associated with corporate, enterprise, or government login information. In further embodiments, the username is a random identifier assigned to the user. In these embodiments, the random identifier is generated by the secure collaboration application and confirmed by the secure communication platform. Alternatively, the random identifier is assigned to the user by the secure communication platform.

In block 620, the secure collaboration application generates a First Root Signing Key Pair for the user. In preferred embodiments, the First Root Signing Key Pair is a long-term asymmetric key pair generated using an asymmetric key derivation function in accordance with the first cipher suite. For example, the First Root Signing Key Pair is generated according to a first elliptic curve cryptography (ECC) key generation algorithm using a P-521 curve. In block 630, the secure collaboration application generates a Second Root Signing Key Pair for the user. Preferably, the Second Root Signing Key Pair is a long-term asymmetric key pair generated using an asymmetric key derivation function in accordance with the second cipher suite. In these examples, the Second Root Signing Key Pair is generated according to a second elliptic curve cryptography (ECC) using an ed448 curve.

In block 640, the secure collaboration application generates a Remote Storage Root Key. In preferred embodiments, the Remote Storage Root Key is a symmetric key that is randomly generated by the secure collaboration application that is used to encrypt account-level backups of the secure collaboration application. In particular, account information is encrypted with the Remote Storage Root Key using any symmetric encryption algorithm, such as AES, DES, and 3DES, and uploaded to the secure communication platform for storage. Next, the secure collaboration application generates a Node Storage Root Key in block 650. The Node Storage Root key is randomly generated and used to encrypt data stored on the user's device. Data stored on the user device may be encrypted according to any symmetric encryption algorithm, preferably AES-GCM. In block 660, the secure collaboration application derives an Escrow Key. The Escrow Key is randomly generated and is used to encrypt user information, including a plurality of keys that are used to identify the user, that is uploaded to and stored on the secure communication platform. User enrollment is completed in block 670 when the secure collaboration application transmits the username, the First Public Root Signing Key, and the Second Public Root Signing Key to the secure communication platform. In response to receiving the username, the First Public Root Signing Key, and the Second Public Root Signing Key, the secure communication platform creates a new entry in database 430 for the user.

Figure 7:
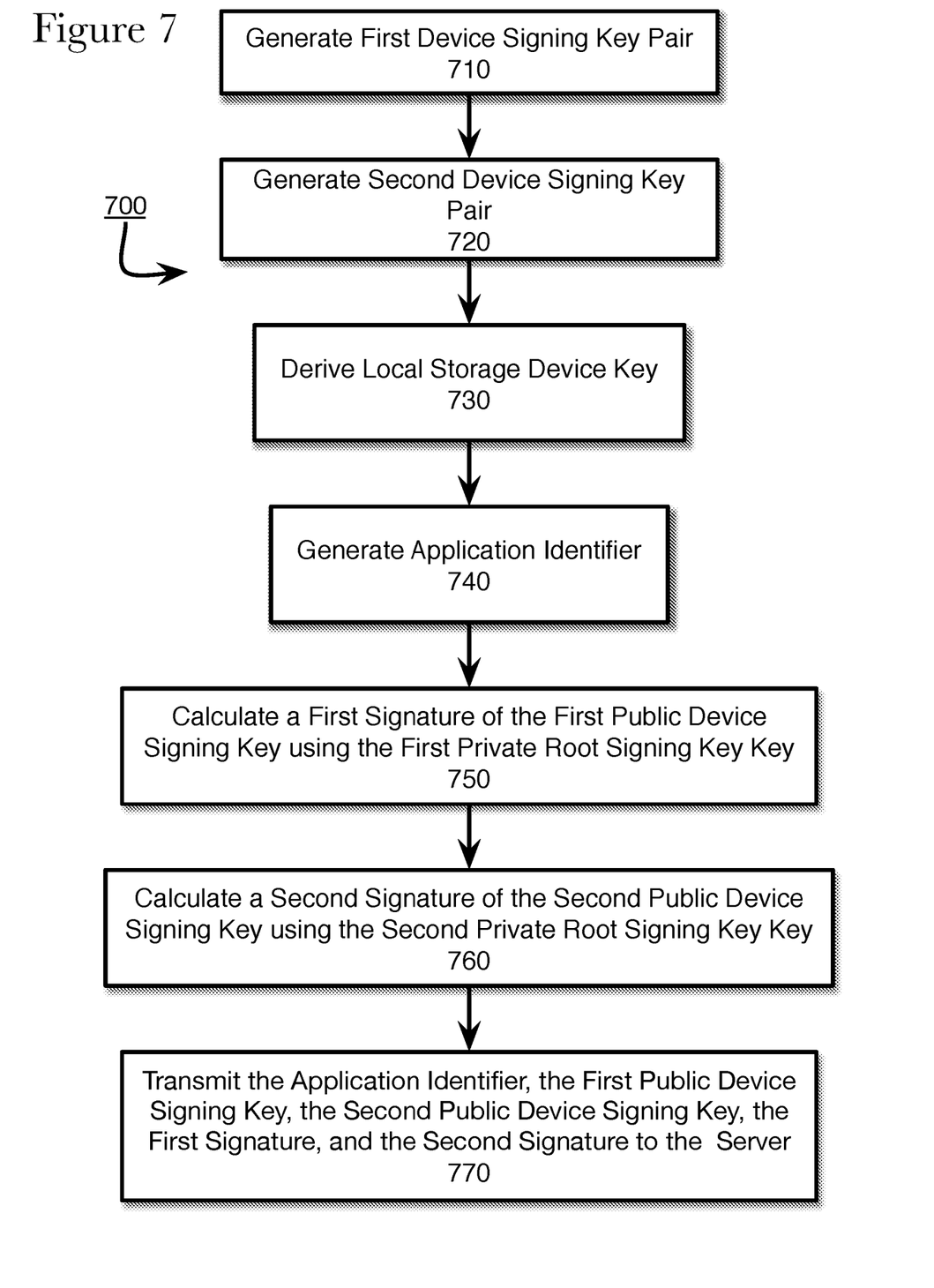
FIG. 7 shows a device enrollment process according to another aspect of the disclosure.

Once user enrollment is completed, the device on which the secure collaboration application is installed is enrolled with secure communication platform. Device enrollment occurs any time a user logs in to the secure collaboration application on a new device, including the device from which user enrollment is performed. FIG. 7 illustrates a process 700 for enrolling a device with the secure communication platform according to one aspect of the disclosure.

In block 710, device enrollment with the secure collaboration application generating a First Device Signing Key Pair. The First Device Signing Key Pair is a long-term asymmetric key pair generated using an asymmetric derivation function. In preferred embodiments, the First Device Signing Key Pair is generated according to the first cipher suite. Accordingly, the First Device Signing Key Pair is generated according to ECC using a P-521 curve. In block 720, the secure collaboration application generates a Second Device Signing Key Pair. Like the First Device Signing Key Pair, the Second Device Signing Key Pair is a long-term asymmetric key pair generated using an asymmetric derivation function. In preferred embodiments, the Second Device Signing Key Pair is generated according to the second cipher suite. For example, the Second Device Signing Key Pair is generated according to ECC using the ed448 curve. The First Device Signing Key Pair and Second Device Signing Key Pair are unique to the instance of the secure collaboration application. In this regard, if the user has installed the secure collaboration application on several devices, each device will have its own unique First Device Signing Key Pair and Second Device Signing Key Pair, while the First and Second Root Key Pairs are the same for each installation.

In block 730, the secure collaboration application derives a Local Storage Device Key. The Local Storage Device Key protects data stored locally on the user's device via symmetric encryption. In this regard, the Local Storage Device Key is generated by combining the Node Storage Root Key and device data through a key derivation function. In preferred embodiments, the key derivation function is an HMAC key derivation function with SHA-256 as the underlying hash function. In subsequent installations, the secure collaboration application obtains the Node Storage Root Key from the secure communication platform. As used herein, device data includes device-specific data and/or identifiers derived from installed hardware or operating system sources that are unique and constant across application installs. For example, device data may include hard drive identifiers, motherboard identifiers, CPU identifiers, and MAC addresses for wireless, LAN, Bluetooth, and optical cards, configuration information, or a combination of the foregoing.

In block 740, the secure collaboration application generates an Application Identifier. The application identifier is a random identifier that is generated by hashing a set of pseudorandom bytes using SHA256. The node identifier is used by the secure communication platform to identify the secure collaboration application and the device with which it is associated.

In block 750, the secure collaboration application generates a first signature of the First Public Device Signing Key using the First Private Root Signing Key. In preferred embodiments, the secure collaboration application generates the signature according to the first cipher suite. In block 760, the secure collaboration application generates a second signature of the the Second Public Device Signing Key using the Second Private Root Signing Key. In preferred embodiments, the secure collaboration application generates the signature according to the second cipher suite.

In block 770, the application identifier, the First Public Device Signing Key, the Second Public Device Signing Key, the First Signature, and the Second Signature are transmitted to the server. The secure communication platform stores the application identifier, the First Public Device Signing Key, the Second Public Device Signing Key, the First Signature, and the Second Signature are stored within the user's profile on the secure communication platform.

Figure 8:
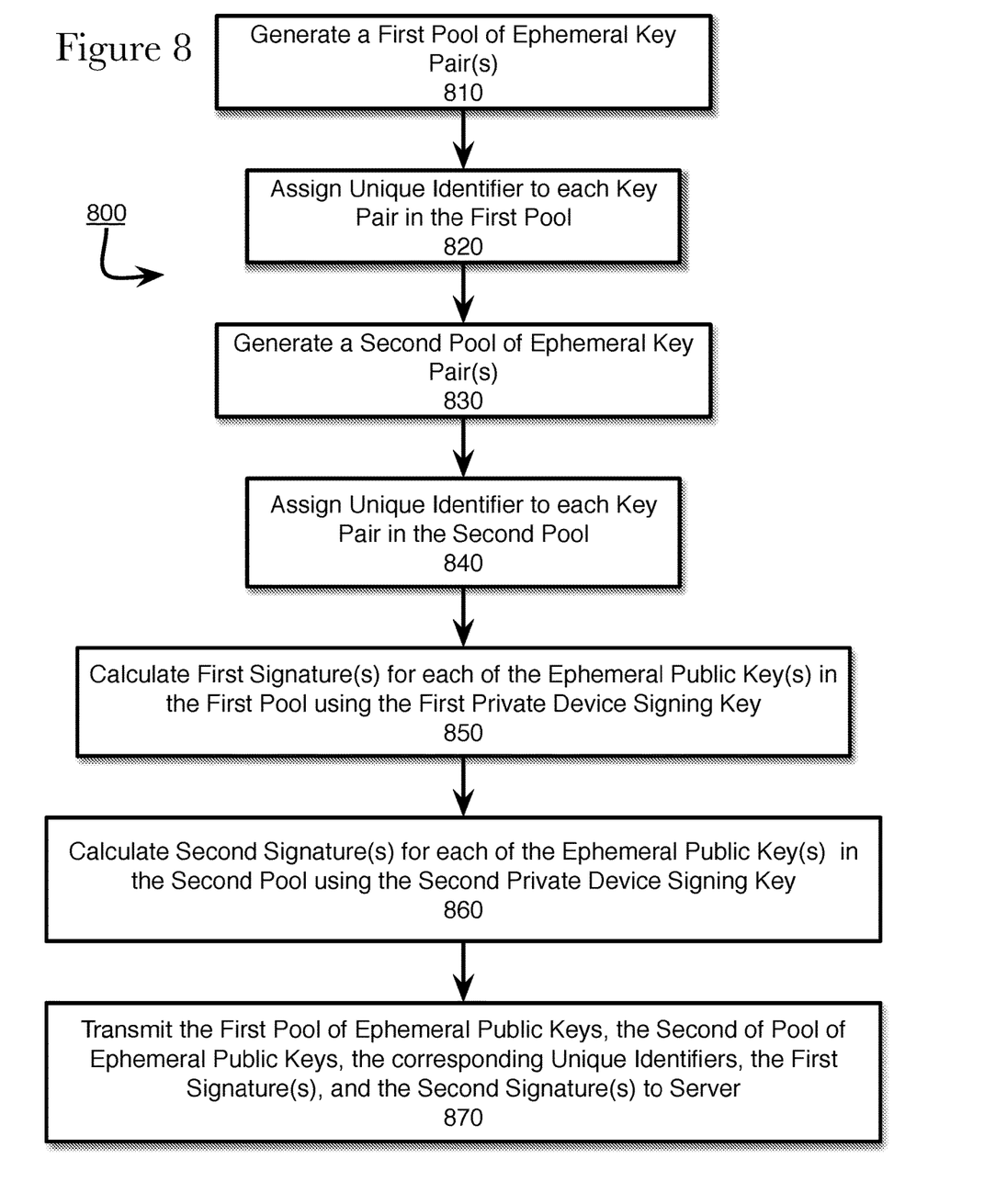
FIG. 8 illustrates a method for generating first and second pools of ephemeral keys according to one embodiment of the disclosure.

After both user and device enrollment have been completed, each instance of the secure collaboration application creates a pool of asymmetric key pairs. These key pairs are used as part of a key agreement protocol and enable the secure collaboration application to begin receiving encrypted communications. As the secure collaboration application begins receiving encrypted communications, the pool of asymmetric key pairs will become depleted and need to be replenished. FIG. 8 shows a method 800 for generating ephemeral asymmetric key pairs.

In block 810, the secure collaboration application generates a first pool of ephemeral, asymmetric key pairs. In preferred embodiments, the key pairs of the first pool are generated according to a first ECC key generation algorithm using a P-521 curve. In block 820, a unique identifier is assigned to each key pair in the first pool. Next, in block 830, the secure collaboration application generates a second pool of ephemeral, asymmetric key pairs. In preferred embodiments, the second pool of key pairs is generated according to a second ECC key generation algorithm using an ed448 curve. In block 840, a unique identifier is assigned to each key pair in the second pool. In block 850, the secure collaboration application calculates a first signature for each of the ephemeral public keys in the first pool. In preferred embodiments, the first signature is generated according to a signature generating algorithm, such as ECDSA, using the First Private Device Signing Key. In block 860, the secure collaboration application calculates a second signature for each of the ephemeral public keys in the second pool. In preferred embodiments, the second signature is generated according to a signature generating algorithm, such as ECDSA, using the Second Private Device Signing Key. In block 870, the first pool of ephemeral public keys and their unique identifiers, the second pool of ephemeral public keys and their unique identifiers, the first signatures, and the second signatures are uploaded to the server. Accordingly, the server stores the pool of ephemeral public keys in the user's profile on the secure communication platform. The first pool of ephemeral private keys and the second pool of ephemeral private keys are encrypted with the Local Storage Device Key and stored securely, along with their assigned unique identifiers, on the user's device.

As noted above, the process 800 is initially performed after the user's first user enrollment and device enrollment. The process 800 is repeated for each new device enrollment. Finally, the method shown in FIG. 8 is repeated as necessary as the pool of asymmetric keys becomes depleted. When a sending secure collaboration application uses one of the public keys, the secure communication platform removes the public key from the pool of available keys on the secure communication platform. In the event the pool is exhausted, the last key in the pool will be re-used until the pool can be replenished.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method for receiving and decrypting an encrypted communication, the method comprising:
   receiving, at a first device, an encrypted communication from a second device, wherein the encrypted communication includes a first encrypted secret, a second encrypted secret, a first signature, and a second signature;
   verifying, by the first device, the first signature and the second signature;
   based on the first and second signatures being valid:
      decrypting, by the first device, the first encrypted secret using a first encryption algorithm associated with the first device;
      decrypting, by the first device, the second encrypted secret using a second encryption algorithm associated with the second device; and
      combining, by the first device, the first decrypted secret and the second decrypted secret to recover a first communication.

2. The method of claim 1, wherein the first communication is selected from the group consisting of: a text message, an SMS message, an MMS message, a video message, a file transfer, a voice recording, a voice memo, and a GIF.

3. The method of claim 1, wherein the first communication is an encryption key.

4. The method of claim 1, further comprising: providing the first communication to a user of the first device.

5. The method of claim 1, wherein decrypting the first secret comprises:
   deriving, by the first device, a first key-encrypting key using, at least in part, a first set of keys generated according to a first key derivation algorithm;
   decrypting, by the first device, a first encrypted communication key using the first key-encrypting key; and
   decrypting, by the first device, the first encrypted secret using the first decrypted communication key.

6. The method of claim 5, wherein decrypting the first secret comprises:
   deriving, by the first device, a second key-encrypting key using, at least in part, second set of keys generated according to a second key derivation algorithm;
   decrypting, by the first device, a second encrypted communication key using the second key-encrypting key; and
   decrypting, by the first device, the second encrypted secret using the second decrypted communication key.

7. The method of claim 1, wherein verifying the first signature comprises:
   verifying, by the first device, the first signature with a first public key associated with the second device.

8. The method of claim 7, wherein verifying the second signature comprises:
   verifying, by the first device, the second signature with a second public key associated with the second device.

9. A system, comprising:
   an interface configured receive an encrypted communication from a second device, wherein the encrypted communication includes a first encrypted secret, a second encrypted secret, a first signature, and a second signature;
   a processor configured to verify the first signature and the second signature, decrypt the first encrypted secret using a first encryption algorithm associated with a first device, and decrypt the second encrypted secret using a second encryption algorithm associated with the second device, and combine the first decrypted secret and the second decrypted secret to recover a first communication; and
   a memory configured to store data and instructions for the processor to recover the first communication.

10. The system of claim 9, further comprising: an output unit configured to provide the first communication to a user of the system.

11. The system of claim 9, wherein the first communication is an encryption key.

12. The system of claim 9, wherein the processor is further configured to combine the first decrypted secret and the second decrypted secret according to a secret sharing algorithm.

13. A non-transitory computer-readable medium comprising instructions that when, executed by at least one processor, perform the steps of:

receiving, at a first device, an encrypted communication from a second device, wherein the encrypted communication includes a first encrypted secret, a second encrypted secret, a first signature, and a second signature;

verifying, by the first device, the first signature and the second signature;

based on the first and second signatures being valid:
- decrypting, by the first device, the first encrypted secret using a first encryption algorithm associated with the first device;
- decrypting, by the first device, the second encrypted secret using a second encryption algorithm associated with the second device; and
- combining, by the first device, the first decrypted secret and the second decrypted secret to recover a first communication.

14. The non-transitory computer-readable medium of claim 13, wherein the first communication is an encryption key.

15. The non-transitory computer-readable medium of claim 13, further comprising instructions for:

providing the first communication to a user of the first device.

16. The non-transitory computer-readable medium of claim 13, wherein decrypting the first secret includes instructions for:

- deriving, by the first device, a first key-encrypting key using, at least in part, a first set of keys generated according to a first key derivation algorithm;
- decrypting, by the first device, a first encrypted communication key using the first key-encrypting key; and
- decrypting, by the first device, the first encrypted secret using the first decrypted communication key.

17. The non-transitory computer-readable medium of claim 16, wherein decrypting the first secret includes instructions for:

- deriving, by the first device, a second key-encrypting key using, at least in part, second set of keys generated according to a second key derivation algorithm;
- decrypting, by the first device, a second encrypted communication key using the second key-encrypting key; and
- decrypting, by the first device, the second encrypted secret using the second decrypted communication key.

18. The non-transitory computer-readable medium of claim 13, wherein verifying the first signature comprises instructions for: verifying, by the first device, the first signature with a first public key associated with the second device.

19. The non-transitory computer-readable medium of claim 18, wherein verifying the second signature comprises instructions for: verifying, by the first device, the second signature with a second public key associated with the second device.

* * * * *